Oct. 20, 1931.   R. C. ALLEN   1,827,866

PACKING GLAND

Filed April 16, 1926

R. C. Allen
INVENTOR

BY A. B. Reavis
ATTORNEY

WITNESS

Patented Oct. 20, 1931

1,827,866

UNITED STATES PATENT OFFICE

ROBERT C. ALLEN, OF SWARTHMORE, PENNSYLVANIA, ASSIGNOR TO WESTINGHOUSE ELECTRIC & MANUFACTURING COMPANY, A CORPORATION OF PENNSYLVANIA

PACKING GLAND

Application filed April 16, 1926. Serial No. 102,518.

My invention relates to packing glands, such as rotatable shaft packing glands, and particularly to liquid glands for sealing the shafts of fluid motors, such, for example, as steam turbines, and it has for an object to provide apparatus of the character designated which shall operate efficiently and which shall be capable of effectively sealing against substantial pressure differences. It has for a further object to provide a packing gland which shall prevent the permeation of air through the liquid seal to the turbine and which shall require a minimum amount of liquid in the sealing process.

Figure 1:
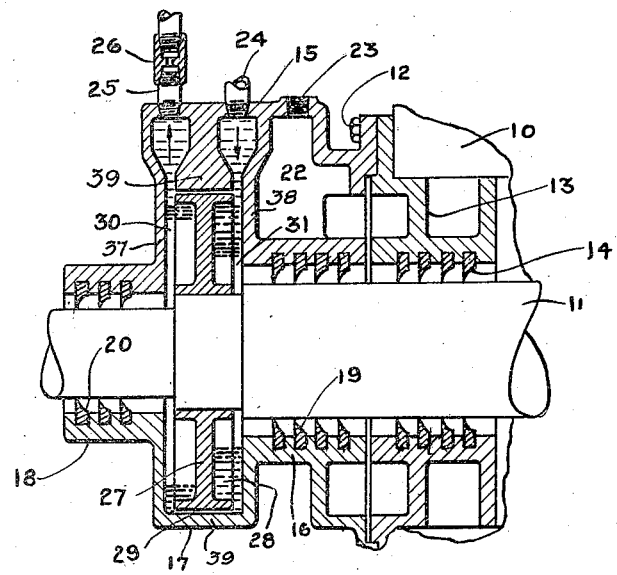
Figure 2:
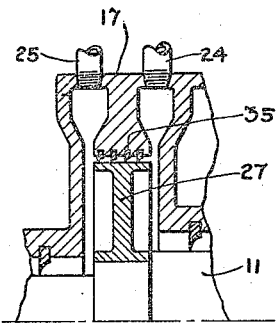
Figure 3:
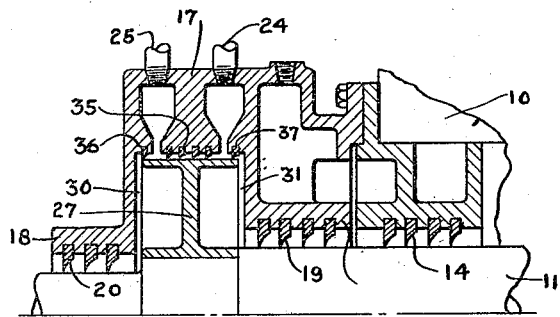

These and other objects, which will be made apparent throughout the further description of my invention, may be attained by the employment of the apparatus hereinafter described and illustrated in the accompanying drawings in which Fig. 1 is a view, in sectional elevation, of one form of packing gland constructed in accordance with my invention and Figs. 2 and 3 are partial views, in sectional elevation, of two additional forms of packing glands similar to that shown in Fig. 1 with the exception that labyrinth packing elements are interposed between the rotating runner and the housing.

Centrifugal liquid sealing devices or packings are generally recognized as providing a very effective means for preventing the leakage of fluid between the rotor and the casing of steam turbines. Apparatus of this character generally includes a runner which is attached to the turbine rotor and adapted to operate in a closed annular chamber communicating with the turbine casing. In operation, the centrifugal action of the rotating runner maintains a relatively small quantity of water, which is present in the annular chamber, against the outer walls at a pressure sufficient to prevent leakage of air into the turbine, as under high vacuum conditions, or steam from leaking out of the turbine, as under atmospheric exhaust or back pressure exhaust conditions. The runner velocities of glands of this character are generally somewhere between 100 and 200 feet per second while the clearances normally provided between the runner and the gland chamber may vary from 1/32 to 1/4 of an inch.

It is a well known fact that up to a certain velocity, known as the "critical velocity", the flow of liquid through a conduit of definite dimensions is calm and uniform while beyond that point the flow is turbulent, violent and agitated and innumerable eddies prevail. (See Mark's Mechanical Engineer's Handbook, 1916 edition, page 275.) The point of transition from the calm to the turbulent state of flow is dependent upon the temperature of the liquid and upon the nature and dimensions of the walls of the passage. The change takes place suddenly and may even occur in a tube composed of smooth glass. I have found that, in packing glands of the type normally associated with steam turbines, the rotational velocity of the gland runner is necessarily such that a turbulent condition of flow of the sealing liquid prevails at all times. Such a turbulent fluid condition obviously promotes air absorption, the air being entrained on the high pressure side of the liquid seal and liberated from the low pressure side. As a result, glands associated with turbines operating under high vacuum conditions permit air to be freely liberated into the turbine casing. Not only does such a liberation of air impair the vacuum prevailing within the turbine casing, but it causes a large amount of water to be torn from the sealing annulus and to be deposited therein. Such a deposit of liquid in the turbine casing materially increases the amount of fluid consumed by the gland in the sealing process while the entrainment of air materially reduces the specific gravity of the sealing body so that a greater depth of annulus must be maintained to effect the required sealing action.

In view of the fact that most glands rotate at such velocities that the sealing liquid is generally turbulent and the entrainment of air prevalent, I have conceived the idea of so constructing a packing gland that sealing liquid is continually circulated through the gland housing in a direction counter to fluid leakage. With such a gland, the air attempting to find its way into the turbine casing via the liquid seal must pass through the sealing liquid circulating in an opposing direction and is consequently entrained therein and carried to the outside of the gland housing. In this way, the low pressure side of the sealing annulus, that is, the side disposed contiguous to the turbine casing, is maintained substantially free of entrained air at its normal density. I prefer to so construct my gland that the area of flow connecting the lateral faces of the runner, and through which the circulating fluid must pass, is made relatively small by the employment of labyrinth packing elements. In this manner, the amount of liquid circulated through the gland housing is reduced to a minimum.

Referring now to the drawings for a detailed description of my invention, I show in Fig. 1 a turbine casing 10 provided with a rotor 11. Inserted within the casing and suitably secured thereto, as by bolts 12, is a packing cylinder 13 provided with a series of labyrinth packing elements 14 of any well-known type. Disposed adjacent to the packing cylinder and also secured to the turbine by the bolts 12 is a member 15 comprising an inner packing cylinder 16, a housing 17 and an outer packing cylinder 18. The inner and outer packing cylinders 16 and 18 are provided respectively with a series of labyrinth packing elements 19 and 20 which may be of any well-known type. The packing cylinder 13 and the inner packing cylinder 16 cooperate to provide an annular passage 22 having a vapor outlet connection 23. The housing 17 comprises lateral walls 37 and 38, and a bore or outer peripheral wall 39 connecting the outer peripheries of the lateral walls, thereby defining an annular inwardly opening chamber. Provided in one end of the housing 17 is a sealing liquid inlet 24 and in the opposite end is a sealing liquid outlet 25, both of which communicate with the chamber defined by the housing 17 at points disposed radially outwardly of the inner periphery of the chamber. An orifice 26 for restricting the flow and for retaining the fluid pressure within the housing is provided in the outlet 25. Disposed in the chamber formed by the housing 17 and rigidly secured to the rotor 11 is a runner 27 provided with a plurality of radially disposed impelling vanes 28. The diameter of the runner may be made slightly less than the bore of the housing 17 so that a passage 29 of limited flow area intervenes between the runner 27 and its housing 17 while the transverse faces of the runner 27 may, if desired, be amply spaced from the lateral walls of the housing 17. The transverse faces of the runner define, with the lateral walls of the housing, respective sealing annuli 30 and 31.

The operation of the above embodiment of my invention is as follows:—

Assuming the turbine to be exhausting against a sub-atmospheric pressure, there is a natural tendency for the surrounding air to attempt to find its way into the turbine casing. Any suitable sealing fluid, such as water, is therefore, supplied through the liquid inlet connection 24 to the housing 17. As I have assumed in the present case that the turbine is exhausting against a sub-atmospheric pressure, the sealing liquid is preferably supplied at a pressure of about 20 pounds per square inch. The sealing liquid conveyed to the housing 17 is held in the form of a solid annulus in the space intervening between the runner 27 and its housing 17 by the centrifugal pumping action of the runner. As shown in the drawing, the depth of the sealing annulus 31 is greater than that of the annulus 30 by an extent determined by the difference in pressure prevailing on the inside and the outside of the turbine casing.

As stated heretofore, the rotational velocity of a gland runner is generally such that the sealing liquid is impelled about the housing 17 at such a velocity that it is constantly in a turbulent condition and as a consequence the air which works its way past the labyrinth packing elements 20 and enters the housing 17 is readily entrained in the sealing annulus 30. This entrained air is naturally conducted by the sealing liquid from the high pressure side of the runner toward the low pressure side of the runner, that is, toward the turbine casing. In my novel form of packing gland, however, I maintain a constant circulation of sealing liquid through the annular clearance 29 to the outlet 25. The direction of flow of this liquid is counter to that of the entering air so that the latter is arrested in the annular clearance 29 and carried through the outlet 25. In this manner, the air is prevented from reaching the annulus 31 which is disposed adjacent to the turbine casing. As a result, the liquid composing the annulus 31 retains its normal density owing to the absence of entrained air and the annulus may be maintained at a minimum depth consistent with its operating pressure. While the depth of the sealing annulus 31 may be of no material consideration when sealing against a pressure difference of only 10 or 15 pounds per square inch, nevertheless this feature is of vital importance in constructing glands for sealing against very high pressure differences, such as 300 pounds per square inch. As no air reaches the annulus 31, no air can be deposited in the turbine casing and the carrying or tearing away of large globules of sealing liquid from the inner surface of the annulus 31 through the liberation of entrained air is prevented.

The outlet 25 is provided with an orifice 26 so that the flow of sealing liquid through the annular passage 29 is accurately regulated while the required liquid pressure is retained in the housing 17. The outer diameter of the runner 27 closely approximates that of the bore of the housing 17 so that the flow area of the annular passage 29 is restricted and the entrainment of the air in the circulating liquid facilitated.

Owing to the difference in pressure prevailing on opposite sides of the runner 27, there is a constant conduction of heat through the liquid from the high pressure side of the runner to the low pressure side. There is also a transformation of mechanical energy into heat due to the friction of the sealing liquid on the walls of the chamber 17 and on the surfaces of the runner 27.

The accumulation of such heat raises the temperature of the sealing liquid, and where the pressure in the turbine is sub-atmospheric, the boiling point will quickly be reached. Boiling results in a lowering of the density of the sealing liquid, which will overflow the inner annulus 31, and leak into the turbine unless the inner annulus is made unduly deep. Boiling also allows leakage of the liquid which is vaporized. In my arrangement, however, the cool sealing liquid circulating through annular passage 29 commingles with the liquid in annuli 30 and 31, which is thereby maintained at a far lower temperature than is possible with glands of the ordinary type. The density of the sealing liquid in annulus 31 is thus maintained constant. One advantage of this is that the necessary depth of annulus 30 is less and can be calculated on the basis of the normal density of the sealing liquid.

It is obvious that the reduction in temperature substantially reduces the amount of vapor generated by the gland in the sealing process. Should, however, a slight amount be generated, it is liberated from the low pressure side of the runner, that is, the annulus 31, its escape being somewhat retarded by the packing elements 19. This vapor finally enters the annular passage 22 wherein it commingles with the vapor which has escaped through the labyrinth packing elements 14. The vapor accumulated within the annular passage 22 may be discharged through the vapor outlet connection 23 to any region of sufficiently low pressure as, for example, a condenser or the suitable stage of an associated lower pressure turbine. In this manner, the sealing fluid together with the heat energy which it has absorbed is retained in the power plant system.

In Fig. 2 I show a desirable embodiment of my packing gland in which a series of labyrinth packing elements 35, of any well known type, are located between the inlet 24 and the outlet 25. These packing elements may be fixed in the stationary housing 17 and closely approach the outer circumference of the rotating runner 27. Such construction provides mechanical safety, inasmuch as a slight radial displacement of the runner 27 relative to its housing 17 does not result in seriously damaging the gland. The labyrinth packing elements 35 may be one of many well-known types and the method of employing the same is well known in the turbine art.

In Fig. 3 I show still another embodiment of my invention in which not only are labyrinth packing elements 35 located between the inlet 24 and the outlet 25 but additional labyrinth packing elements 36 and 37 are disposed on opposite sides of the inlet and outlet respectively. The provision of the labyrinth packing elements 36 and 37 results in segregating the sealing annuli 30 and 31 from the turbulence or agitation created by the liquid in circulating through the annular passage 29. This insures that the liquid contained in both annuli 30 and 31 is more tranquil and as a consequence its ability for entraining air is materially lessened.

From the foregoing it will be apparent that I have invented a novel form of packing gland which is capable of effectively sealing against substantial pressure differences and in which the permeation of air through the liquid seal is practically eliminated. In addition, the vaporization of the sealing liquid is reduced to a minimum while the liquid in the seal is retained at its normal density, thereby assuring reliability of operation. While I have illustrated my packing gland with the sealing liquid circulating away from the turbine casing, it is obvious that where I desire to employ my packing gland with a turbine exhausting against a back pressure, I may readily rearrange the gland with the direction of sealing liquid reversed. In addition, while I have referred to water as the sealing liquid, it is within the purview of my invention to employ any other fluid which may be found suitable for accomplishing the desired results.

While I have shown my invention in several forms it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:—

1. In a device for packing the shaft of a fluid motor, the combination of a stationary housing providing an inwardly opening annular chamber, a rotatable runner disposed within the chamber for maintaining a sealing annulus, the outer peripheral surface of the runner being disposed in closely spaced relation and the transverse surfaces of the runner being disposed in relatively wide spaced relation to the internal walls of the chamber, means for admitting a sealing medium to one end of the chamber, and means for removing the sealing medium from the opposite end of the chamber, both of said means communicating with the chamber at points disposed radially outwardly of the inner periphery of the chamber, and providing a flow therethrough in a direction counter to the direction in which fluid leakage tends to flow through said chamber.

2. In a device for sealing the shaft of a fluid motor, the combination of a stationary housing, a rotatable runner disposed within the housing for maintaining a sealing annulus, means for admitting a sealing medium to the housing, means for removing sealing medium from the housing, a plurality of labyrinth packing elements interposed between the admission and removal means for restricting the flow of sealing medium between the rotating runner and the stationary housing, and additional packing elements disposed on the opposite sides of the inlet and the outlet respectively for segregating the chamber defined by the peripheral surface of the runner and the bore of the housing from the chambers defined by the transverse surfaces of the runner and the lateral walls of the housing.

3. In a device for sealing a rotating shaft against leakage of fluid from a zone of high pressure to a zone of low pressure, the combination of a stationary gland housing having two lateral walls and a peripheral wall defining an inwardly-opening annular chamber, a rotating runner carried by the shaft and extending into the chamber, means communicating with the chamber at points spaced axially and disposed radially outward of the inner periphery thereof for circulating sealing medium therethrough in a direction counter to the direction in which fluid tends to leak through said chamber, and a labyrinth packing element interposed between the admission and removal means for restricting the flow of sealing medium through the chamber.

4. The combination with the vacuum end of an elastic fluid turbine casing and a rotatable shaft projecting into said vacuum end through an opening in the casing, of a sealing device for preventing the entrance of air into said casing through said opening comprising a housing carried by said casing and defining an annular chamber opening radially inwardly, a rotatable runner mounted on the shaft and extending into the chamber to maintain an annulus of sealing liquid therein, the axially outer side of the liquid sealing annulus being exposed to air from the atmosphere, means for admitting sealing liquid to the chamber at a point disposed radially outwardly of the inner periphery thereof and at the axially inner side of the chamber, and means for removing sealing liquid from the chamber at a point disposed radially outwardly of the inner periphery of the chamber and at the axially outer side of the chamber, whereby the flow of sealing liquid is directed toward the incoming air and carries away air which becomes entrained in the sealing liquid.

5. The combination with an elastic fluid turbine casing having a chamber containing motive fluid at a pressure below atmospheric pressure and a rotatable shaft projecting into said chamber through an opening in the casing, of a sealing device for preventing entrance of air into said chamber through said opening including a housing carried by the casing and defining an annular chamber opening radially inwardly, a rotatable runner mounted on the shaft and extending into the annular chamber for maintaining an annulus of sealing liquid therein, the axially outer side of the liquid sealing annulus being exposed to air from the atmosphere, means for admitting sealing liquid to the annular chamber at one point and means for discharging sealing liquid at a point spaced axially from the first-mentioned point and on the side thereof away from the interior of the turbine casing, so as to provide a flow of sealing liquid axially outwardly against the incoming air for carrying away air which becomes entrained in the sealing liquid.

6. The combination with an elastic fluid turbine casing having a chamber containing motive fluid at a pressure below atmospheric pressure and a rotatable shaft projecting into said chamber through an opening in the casing, of a sealing device for said opening including a housing carried by the casing and defining an annular chamber opening radially inwardly, a rotatable runner mounted on the shaft and extending into the annular chamber, said annular chamber being formed with axially spaced openings disposed radially outwardly of the inner periphery of the annular chamber, means for admitting sealing fluid to the annular chamber through the opening nearer to the interior of the turbine casing, means for discharging sealing fluid from the annular chamber through the opening away from the interior of the turbine casing, and packing elements in the annular chamber disposed between said openings.

In testimony whereof, I have hereunto subscribed my name this fifteenth day of April, 1926.

ROBERT C. ALLEN.